June 5, 1928.  J. OTTO  1,672,498
FISHING DEVICE
Filed Nov. 18, 1926
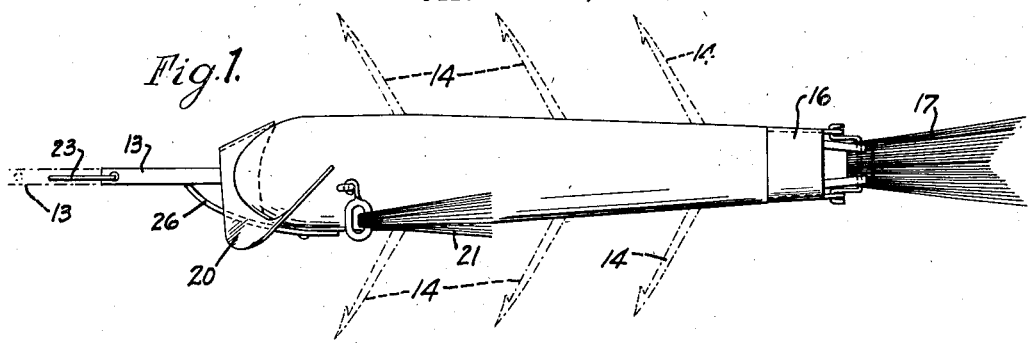
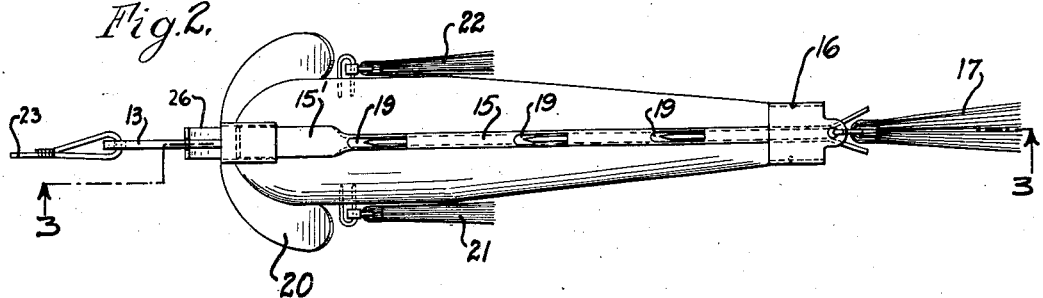
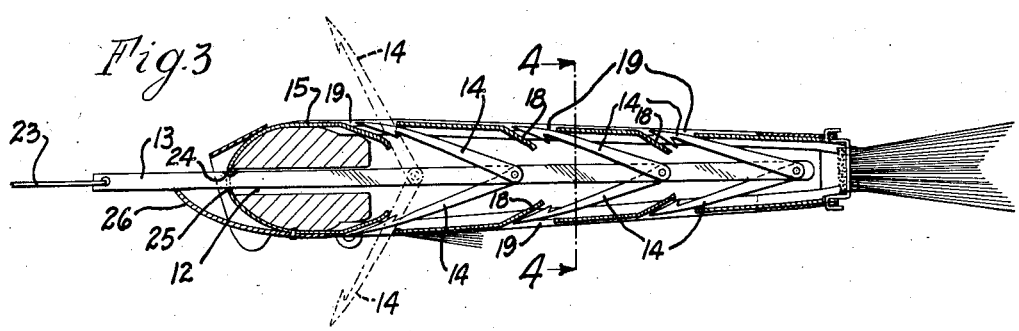
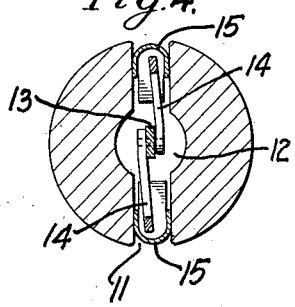
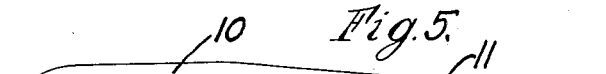
Inventor
John Otto
by Frank J Schraeder Jr
Attorney.

Patented June 5, 1928.

1,672,498

UNITED STATES PATENT OFFICE.

JOHN OTTO, OF CHICAGO, ILLINOIS.

FISHING DEVICE.

Application filed November 18, 1926. Serial No. 149,044.

The invention relates to artificial lures, preferably, although not exclusively, used for catching game fish.

The art of artificial lures is highly developed and many ingenious devices have been provided for the purpose of catching game fish, but these devices are inferior because the arrangement of the hooks does not insure the proper engagement in the soft part of the mouth of the fish. The hooks are in many instances loosely depending from the lure and when the fish strikes the same, the hook meets the bony substance of the mouth in which strong teeth are set so that the hooks are liable not to become anchored in the vulnerable part of the mouth. To obviate this uncertainty, the present invention provides an artificial lure which has its hooks arranged in such manner that upon the lure being seized by a fish, the hooks will be placed in operative position so as to penetrate the soft part of the mouth to become anchored therein to prevent the release of the fish from the hook upon its torsional or oscillating movement.

A further object of the invention aims at providing an artificial bait which has the hooks concealed in the interior thereof so that the bait will be snag-proof and will not be caught by weeds, sand or other conglomerations.

It is also an object of the invention to provide a plurality of pivoted hook members which when collapsed are within the interior of the bait body and which under a pull are unitarily opened into operative position.

With these and other important objects in view, the invention comprises the means described in the following specification, particularly pointed out in the appended claim forming a part thereof, and illustrated in the accompanying drawing, in which:

Figure 1 is a side view of the bait constructed in accordance with my invention;

Figure 2 is a top plan view of the bait;

Figure 3 is a longitudinal section on the line 3—3 of Figure 2;

Figure 4 is a section on the line 4—4 of Figure 3; and

Figure 5 shows the body portion of the bait.

As indicated in Figure 5, the body portion of the bait comprises a wooden body 10 of any preferred or desired configuration, and simulating a fish. The body portion is slotted from the rear end to a point between the center and the forward end of the bait as at 11, leaving at the front, a solid portion which is traversed by a longitudinal bore 12, for a purpose hereinafter described.

A rod 13 is adapted to be introduced through the bore 12 and this rod has pivotally secured thereto at distant points, hook members 14 which normally occupy the position shown in Figure 3 and thus are concealed within the body portion 10 of the bait. A unitary member in the form of a band 15 encompasses the bait 10 along the center thereof and the free ends of the band are held together by a sleeve 16 which surrounds the rear end of the bait and has secured thereto a brush 17 to simulate the fin of a fish. The band 15 has a semicircular cross section and has stamped out therefrom at spaced portions, lugs 18 which serve as guides for the points of the hook members to permit passage of the hook members through apertures 19 in the band provided by the stamped out portions 18. A deflector 20 is secured to the forward end of the bait in order to insure proper movement of the bait in the water. Fins 21 and 22 are secured to the sides of the bait in order to enhance the simulation of a fish. The rod 13 is apertured at the front end and has secured thereto the leader line 23.

Attention is called to the fact that the rod 13 is provided with a notch 24 in which enters the edge of an aperture 25 provided in the forward part of the band 15 to permit passage of the rod 13. The band 15 is also provided with a flat spring 26 which bears on the lower side of the rod 13 to guide the same.

The use of the device is as follows: As soon as a game fish snaps at the bait and seizes the same, the body portion 10 of the bait is withdrawn to the rear, causing thereby the hooks to open and to project through the apertures 19 of the band into the position shown in dash-and-dotted lines in Figures 1 and 3. The hooks thereupon enter the soft part of the mouth of the fish and become anchored therein. After the fish has been caught and removed from the bait, the body portion 10 of the bait is shifted forwardly, whereby the hook members 14 are collapsed into the position shown in full lines in Figure 3 so as to be obscured from view and be confined completely within the outline of the body portion 10. Consequently, there is no liability that the hooks will become anchored in weeds, so that the effectiveness of the bait and the reliability thereof are greatly enhanced.

While the drawing shows the preferred embodiment of the invention, numerous changes and alterations may be made without departing from the spirit of the invention. I, therefore, do not wish to limit myself to the particular details as shown, but wish to include all changes, alterations, modifications, revisions and re-arrangements constituting departures within the scope of the invention, as defined in the appended claim.

I claim:

An artificial lure, comprising a casing having a longitudinal bore at the forward end and a slot extending the remainder of said casing, a rod housed in said casing, a plurality of hooks pivotally secured to said rod and normally concealed within said casing, and a band encompassing said casing and having means for guiding said hooks to assume functional position.

In witness whereof I affix my signature.

JOHN OTTO.